Patented Feb. 18, 1941

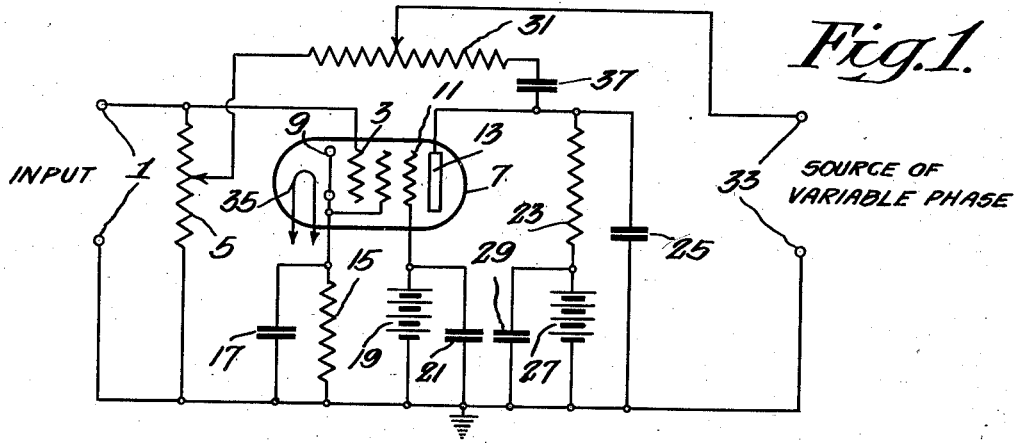
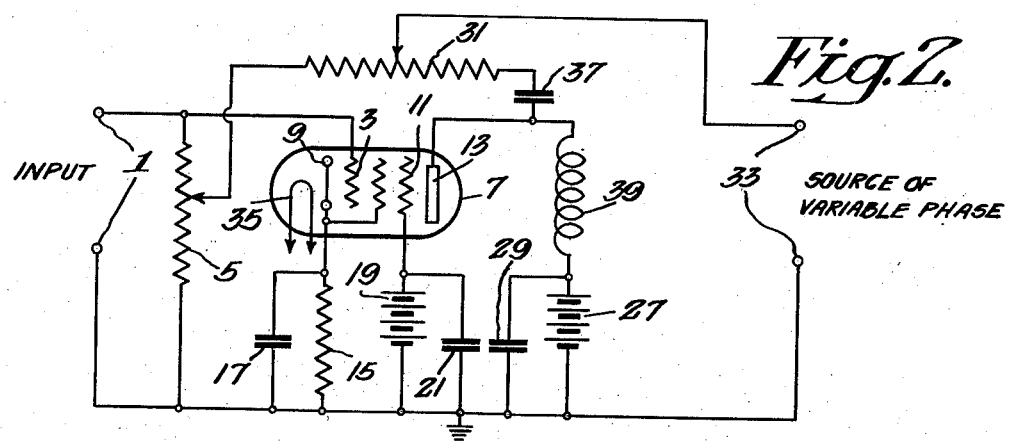
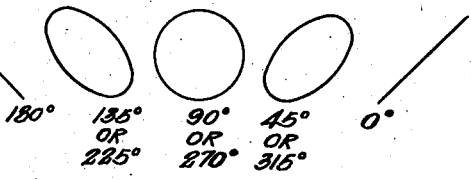

2,231,955

UNITED STATES PATENT OFFICE 2,231,955

PHASE SHIFTING DEVICE

Harold J. Schrader, Haddon Heights, N. J., assignor to Radio Corporation of America, a corporation of Delaware Application February 25, 1938, Serial No. 192,587

9 Claims. (Cl. 172—238)

My invention relates to phase-shifting networks and more particularly to one in which a phase shift between the grid and anode of a vacuum tube is utilized to supply a voltage of variable phase which may be used for measurement or other purposes.

The use of a cathode ray tube in determining the phase relation between two voltages is well known. By means of the Lissajous figures it is possible to measure the phase relation between two similar voltages which are applied to the deflecting plates. This method is satisfactory where only an approximation of the phase relation is required, or, if more accurate measurements are desired, where a large tube is available whose deflecting plates are nearly perfectly aligned. With the usual small cathode ray tubes, or with tubes whose mechanical construction is not known to be accurate, reliable measurements cannot be made if they must depend upon a mechanical measurement of the slope of the Lissajous figure.

Accurate measurements could be made electrically if a device was available by which the phase of one of the voltages could be shifted a determinable amount. The cathode ray tube would then be used to indicate when the two voltages had some definitely recognizable relation, such as 0° phase shift, or 180°, or any other desired relation which does not depend upon the measurement of an angle but merely the recognition of a particular pattern. The degree of phase shift could be determined by the calibration of such a device, and would be a measure of the original displacement.

It is evident that a phase shifting device of this nature must meet several requirements. It should preferably deliver a voltage whose frequency is equal to that of the unknown voltages, and its calibration must remain unchanged over a wide range of frequency. In my invention I have accomplished this by means of a device consisting essentially of a vacuum tube having a reactive anode load circuit and a potentiometer connected between grid and anode. When one of the unknown voltages is impressed on the grid of this vacuum tube, an output voltage of the same frequency is obtained from the potentiometer. The phase of this voltage may be varied over substantially 90° with respect to the voltage on the grid by varying the potentiometer.

It is, therefore, an object of this invention to provide means for obtaining a voltage having a known phase angle with relation to another voltage.

It is another object of this invention to provide means for readily varying the phase of one voltage with respect to another substantially independently of frequency.

A further object of my invention is to provide means for shifting the phase of a given voltage over a continuously variable range.

My invention will be better understood from the following description, when considered in connection with the accompanying drawing. Its scope is indicated by the appended claims.

Referring to the drawing—

Figure 1 is a preferred embodiment of my invention utilizing a capacitive plate load, Figure 2 is an embodiment in which the plate load is inductive, and Figure 3 illustrates the nature of the Lissajous figures obtained when the phase relation between two voltages is measured by means of a cathode ray tube.

Similar reference numerals refer to similar parts throughout the several drawings.

Referring to Fig. 1, a pair of input terminals 1 are provided, across which a resistor 5 is connected. One end of this resistor is connected to ground and the other to the control grid 3 of a vacuum tube 7. This vacuum tube may be any convenient triode or pentode tube. For the purposes of illustration, a tube having indirectly heated cathode 9, a suppressor grid, a screen grid 11, and an anode 13, has been illustrated. Cathode 9 is connected to ground through a bias resistor 15 which is shunted by a capacitor 17. A battery 19, connected between ground and screen grid 11, supplies the necessary potential for that electrode. A by-pass capacitor 21 is connected across battery 19. The anode circuit includes a connection from the anode 13 through a resistor 23 and an anode supply battery 27 to ground. Battery 27 is by-passed by capacitor 29. A capacitor 25 is also connected between anode 13 and ground. One terminal of a potentiometer 31 is connected to a tap on resistor 5. The other terminal is connected through a blocking capacitor 37 to the anode 13. A movable arm on potentiometer 31 is connected to one of the output terminals 33. The remaining output terminal is grounded.

In a vacuum tube the anode voltage is 180° out of phase with the applied grid voltage. If the anode load is purely resistive, and a potentiometer is connected in the manner shown in Fig. 1 a voltage is available at the output terminals which is in phase with the grid voltage when the contact is on one side of electrical center, and in phase with the plate voltage when the contact is on the other side of electrical center. A continuously variable phase shift is not obtainable with the foregoing arrangement. However, by making the anode load impedance highly capacitive by means of capacitor 25, the anode current through the capacitor generates a reactive voltage which is 90° out of phase with the current through it. Consequently, the alternating current anode voltage will be 90° out of phase with the applied alternating current grid voltage. The movable arm of the potentiometer 31 will, therefore, make available a voltage having a variable phase over a range substantially equal to 90°.

To obtain the maximum possible phase shift, it is necessary that capacitor 25 have a very low reactance, with respect to the tube anode-cathode resistance, at all frequencies with which this device is to be used. It is also evident that resistor 23 must have a high resistance compared to the reactance of capacitor 25 as it is desirable that the phase angle in the plate circuit be kept as near 90° as possible, and a low value of resistance would tend to oppose this condition.

It is desirable that the voltage delivered by this device have substantially the same potential as that supplied to its input terminals. It has been found that the desirably low impedance of capacitor 25 prevents the tube from amplifying the input signal. In fact, the gain may be slightly less than unity. For this reason, the potentiometer has been connected to a variable tap on resistor 5. The position of this tap is not critical and may be fixed at any position required to obtain substantially unity amplification.

In Fig. 2, an embodiment is shown which differs from that of Fig. 1 only in the use of an inductor 39 as the plate load impedance. Resistor 23 is no longer necessary as the plate potential may be connected in series with this inductor. In general, the method shown in Fig. 2 is interchangeable with that of Fig. 1.

Fig. 3 illustrates 5 Lissajous figures which are obtained from a study with a cathode ray tube of the phase relation of two substantially equal voltages. It may, at first, appear from these figures that it is not possible to obtain an exact determination of the phase relation because of the fact that identical figures are obtained for phase relations differing by 180°. For example, the fourth ellipse represents 45° or 315°. This merely means, however, that the phase relation depends upon which of the two voltages is taken as a reference. It is to be noted that the fact that the phase relation lies between 0° and 90°, or between 90° and 180°, may be determined readily by the slope of the figure.

The potentiometer 31 may be calibrated in terms of phase displacement between 0° and 90°. If then one of the unknown voltages is impressed across the input terminals of this device, a source of voltage having a known phase relation with respect to the input voltage will be available at the output terminals 33. If this output voltage is applied to the cathode ray deflecting plates in place of one of the unknown voltages, and if the potentiometer 31 is varied until the sharp sloping line which characterizes an in-phase relation is obtained on the cathode ray, the phase displacement between the two unknown voltages can be determined accurately by reading the potentiometer calibration. In case the difference between the unknown voltage is greater than 90°, as determined by the Lissajous figure obtained when the unknown voltages are applied directly to the cathode ray, the measurement may be made as above after reversing the leads connecting the output of this device to the cathode ray.

I claim as my invention:

1. In a phase shifting network, the combination including input terminals, a thermionic tube having cathode, grid and anode electrodes, means respectively connecting said cathode and grid electrodes to said input terminals, a reactive impedance connected between said anode and cathode electrodes, a potentiometer having its terminal ends effectively connected between said grid and said anode electrodes, and output terminals connected respectively to a movable contact intermediate the ends of said potentiometer and said cathode so that the phase of an alternating potential applied to said input terminals may be varied over a range by said potentiometer and obtained from said output terminals.

2. In a phase shifting network, the combination including a thermionic tube having cathode, grid and anode electrodes, means for impressing an input voltage, whose phase is to be shifted, between said cathode and grid electrodes, means for maintaining the voltage of said anode in quadrature relation with said input voltage and means including a potentiometer having its terminal ends coupled to said grid and anode electrodes, and a variable contact arm intermediate the ends of said potentiometer connected to an output terminal for obtaining an output voltage whose phase with respect to said input voltage may be adjusted to desired values within said quadrature relation.

3. In a phase shifting network, the combination which includes a thermionic tube having input and output circuits, means for impressing an input voltage, whose phase is to be shifted, on said input circuit, means for maintaining the voltage in said output circuit substantially in phase quadrature with respect to said input voltage, a potentiometer having its terminal ends connected between said input and output circuits, and means including an adjustable contact intermediate the ends of said potentiometer for obtaining an output voltage whose phase with respect to said input voltage may be adjusted to desired values within said quadrature relation.

4. In a device of the character described, a thermionic tube having cathode, grid and anode electrodes, means for impressing a first alternating voltage between said grid and cathode electrodes to thereby produce a second alternating voltage between said anode and cathode electrodes, means whereby said second alternating voltage is made to be substantially in phase quadrature with said first alternating voltage, a potentiometer having a slidable contact intermediate its ends, and means for impressing voltages corresponding in phase, respectively, to said first and second alternating voltages on the respective end terminals of said potentiometer, and output terminals connected, respectively, to the slidable contact of said potentiometer and said cathode.

5. In a phase shifting network, the combination including a thermionic tube having cathode, grid and anode electrodes, said cathode being coupled to a point of ground potential, means for impressing a voltage between said grid electrode and said point of ground potential, said tube having a reactive anode load circuit, a resistor and a blocking capacitor serially connected between said grid and anode electrodes, a slidable contact on said resistor, and a pair of output terminals connected respectively to said slidable contact and said point of ground potential.

6. The combination including a thermionic tube having cathode, grid and anode electrodes, means for impressing an input voltage between said grid and cathode electrodes, a reactive load device connected between said anode and cathode electrodes, the impedance of said device being small with respect to the cathode-anode impedance of said tube, a potentiometer having its terminal ends coupled, respectively, to said grid and anode electrodes, and output terminals connected, respectively, to said cathode and a movable contact intermediate the ends of said potentiometer so that the phase of said input voltage may be continuously shifted over a range.

7. A device of the character described in claim 6 in which said reactive load device is a capacitor.

8. A device of the character described in claim 6 in which said reactive load device is an inductor.

9. The combination including a thermionic tube having cathode, grid and anode electrodes, means for impressing an input voltage between said grid and cathode electrodes, a source of anode voltage, an inductive anode load device having a low impedance with respect to the cathode-anode impedance of said tube, means including said load device for connecting said source of anode voltage to said anode electrode, a potentiometer having a slidable contact intermediate its ends, means effectively connecting the end terminals of said potentiometer to said grid and anode electrodes, respectively, and output terminals connected, respectively, to said slidable contact and said cathode.

HAROLD J. SCHRADER.